United States Patent [19]

Hatakeyama et al.

[11] Patent Number: 4,641,275
[45] Date of Patent: Feb. 3, 1987

[54] VECTOR PROCESSOR HAVING PAIR PROCESS MODE AND SINGLE PROCESS MODE

[75] Inventors: Yasuhiko Hatakeyama, Hadano; Shigeo Nagashima, Hachioji, both of Japan

[73] Assignee: Hitachi, Ltd., Tokyo, Japan

[21] Appl. No.: 572,521

[22] Filed: Jan. 20, 1984

[30] Foreign Application Priority Data

Mar. 2, 1983 [JP] Japan ................. 58-34197

[51] Int. Cl.$^4$ ........................ G06F 9/00; G06F 9/28
[52] U.S. Cl. .................................. 364/900; 364/730; 364/741
[58] Field of Search ... 364/200 MS File, 900 MS File, 364/736, 730, 741, 748

[56] References Cited

U.S. PATENT DOCUMENTS

| | | | |
|---|---|---|---|
| 4,128,880 | 12/1978 | Cray, Jr. ............................. | 364/200 |
| 4,174,514 | 11/1979 | Sternberg ..................... | 340/146.3 MA |
| 4,287,566 | 9/1981 | Culler ................................. | 364/754 |
| 4,412,303 | 10/1983 | Barnes et al. ..................... | 364/900 |
| 4,435,765 | 3/1984 | Uchida et al. ..................... | 364/200 |
| 4,498,134 | 2/1985 | Hansen et al. ..................... | 364/200 |
| 4,524,428 | 6/1985 | Grinberg et al. ................. | 364/900 |
| 4,524,455 | 6/1985 | Holsztynski ....................... | 382/41 |
| 4,541,046 | 9/1985 | Nagashima et al. ............. | 364/200 |
| 4,589,067 | 5/1986 | Porter et al. ..................... | 364/200 |
| 4,594,682 | 6/1986 | Drimak .............................. | 364/900 |

OTHER PUBLICATIONS

C. V. Ramamoorthy & H. F. Li, *Pipeline Architecture*, Computing Surveys (vol. 9, No. 1, Mar. 1977), pp. 61-102.

*Primary Examiner*—Archie E. Williams, Jr.
*Attorney, Agent, or Firm*—Antonelli, Terry & Wands

[57] ABSTRACT

A vector processor has a main storage, a main memory control circuit, vector registers, data transfer circuits; an address register group, and vector arithmetic units. The vector processor performs vector arithmetic processings of vector data received from the vector registers and sends the results to the vector registers. For simple vector instructions, the vector processor divides the vector processings and carries out the vector processings in parallel, using a plurality of sets of the above-mentioned data transfer circuits, vector registers and vector arithmetic units. On the other hand, for complicated vector instructions, the vector processor carries out the vector processings without dividing them using the vector registers, data transfer circuits and vector arithmetic units which were designated by the vector instructions.

4 Claims, 11 Drawing Figures

EXVP INSTRUCTION

EXVP

GR 1

GR 2

EXVP

GR 1

GR 2

```
      Do   100    i = 0 , 31
      A(i) = B(i) + C(i)
100   CONTINUE
```

```
15-1   VL    B
15-2   VL    C
15-3   VEA   A , B , C
15-4   VST   A
15-5   EAP
```

FIG. 4

| MS ADDRESS | MS DATA | | | |
|---|---|---|---|---|
| 1 0 0 | OPCD 0 4 0 2 0 0 | 15-1 | VL | B |
| 1 0 4 | OPCD 0 6 0 3 0 0 | 15-2 | VL | C |
| 1 0 8 | OPCD 0 2 0 4 0 6 | 15-3 | VEA | A,B,C |
| 1 0 C | OPCD 0 2 0 1 0 0 | 15-4 | VST | A |
| 1 1 0 | OPCD 0 0 0 0 0 0 | 15-5 | EAP | |
| 2 0 0 | | | | |
| 2 0 4 | A(0) | | | |
| 2 F 8 | | | | |
| 2 F C | A(31) | | | |
| 3 0 0 | | | | |
| 3 0 4 | B(0) | | | |
| 3 F 8 | | | | |
| 3 F C | B(31) | | | |
| 4 0 0 | | | | |
| 4 0 4 | C(0) | | | |
| 4 F 8 | | | | |
| 4 F C | C(31) | | | |
| 5 0 0 | | | | |

FIG. 6

| | | | | | | | |
|---|---|---|---|---|---|---|---|
| VAR | 0 | X | X | X | X | X | X |
| VAR | 1 | 0 | 0 | 0 | 2 | 0 | 0 |
| VAR | 2 | 0 | 0 | 0 | 3 | 0 | 0 |
| VAR | 3 | 0 | 0 | 0 | 4 | 0 | 0 |
| ViR | 0 | X | X | X | X | X | X |
| ViR | 1 | 0 | 0 | 0 | 0 | 0 | 8 |
| ViR | 2 | 0 | 0 | 0 | 0 | 0 | 8 |
| ViR | 3 | 0 | 0 | 0 | 0 | 0 | 8 |
| VBR | 0 | 0 | 0 | 0 | 0 | 0 | 0 |
| VBR | 1 | X | X | X | X | X | X |
| VBR | 2 | X | X | X | X | X | X |
| VBR | 3 | X | X | X | X | X | X |

VECTOR PROCESSOR HAVING PAIR PROCESS MODE AND SINGLE PROCESS MODE

BACKGROUND OF THE INVENTION

The present invention relates to a vector processor having a plurality of data transfer circuits, a plurality of vector registers and a plurality of vector arithmetic units.

In conventional vector processors, in order to make the processing speed fast by simultaneously executing a plurality of vector instructions, there has been provided a plurality of vector arithmetic units (hereinafter, simply referred to as arithmetic units) and/or a plurality of data transfer circuits (hereinbelow, simply referred to as data transfer circuits) which serve to perform the data transfer between a main storage and the vector registers. However, in the case where the number of instructions of a vector instruction group which constitutes the actual vector processing is small, these plurality of arithmetic units and data transfer circuits are not simultaneously used, so that there is a problem in terms of effective use of resources in the system.

For solving such a problem, it may be considered that, in a vector processor having two arithmetic units, the two arithmetic units may be regarded as one arithmetic unit from a software point of view and the operation for the vector element bearing even numbers is executed by one arithmetic unit when executing vector arithmetic instructions, while the operation for the vector elements bearing odd numbers is simultaneously executed by the other arithmetic unit, thereby to improve the processing speed to about twice the normal speed. This increase in processing speed is effective in case of a simple vector instruction (hereinafter, referred to as a simple instruction) consisting of only the operations between/among a couple/group of data which have the same element number, such as for example a vector addition instruction $$A(i) = B(i) + C(i)$$

(where, $i = 0, 1, 2, \ldots, n$).

However, in addition to the above-mentioned simple instruction, there are also complicated instructions which require the operations between/among a couple/group of data which have different element numbers (hereinafter, referred to as a macro instruction), such as the following iteration instruction $$A(i+1) = A(i) * B(i) + C(i)$$

(where, $i = 0, 1, 2, \ldots, n$).

As described above, when executing a macro instruction using a vector processor which is constituted in such a manner that the vector processings are carried out by dividing the vector elements bearing even numbers and the vector elements bearing odd numbers, a data bus is needed between two arithmetic units, resulting in complexity of control; therefore, it is actually impossible in practice to realize such an arrangement. Consequently, in conventional vector processors, anyone of the following methods may be adopted, that is, a method wherein no macro instruction is supported, a method wherein it is not adopted to divide the vector into the elements bearing even numbers and into the elements bearing odd numbers and thereby to carry out the processings as described above; or a method wherein macro instructions are processed as scalars instead of vectors. However, the above methods are unsatisfactory with respect to high speed processing, performance, or the like.

SUMMARY OF THE INVENTION

It is an object of the present invention to provide a vector processor which can realize high speed processing and can improve the performance as compared with a conventional processor.

The present invention has features such that in a vector processor having a plurality of data transfer circuits and/or arithmetic units to enable high speed processing by simultaneously processing a plurality of vector instructions in parallel, the kinds of vector processings are identified and for the vector processings consisting of only simple instructions, the data transfer circuits, vector registers and arithmetic units are divided into a plurality of sets in accordance with the specification of a flip flop (FF) for the mode control, thereby dividing and performing the vector processings in parallel using those sets, while for the vector processings including macro instructions, the vector processings are executed without dividing them.

BRIEF DESCRIPTION OF THE DRAWINGS

The present invention will be apparent from the following detailed description taken in conjunction with the accompanying drawings, in which:

FIG. 4 is a diagram showing a series of vector instructions on a main storage and an arrangement of the vector data;

FIG. 6 is a diagram showing initialization values of the address register group.

DETAILED DESCRIPTION OF THE PREFERRED EMBODIMENT

Figure 1:
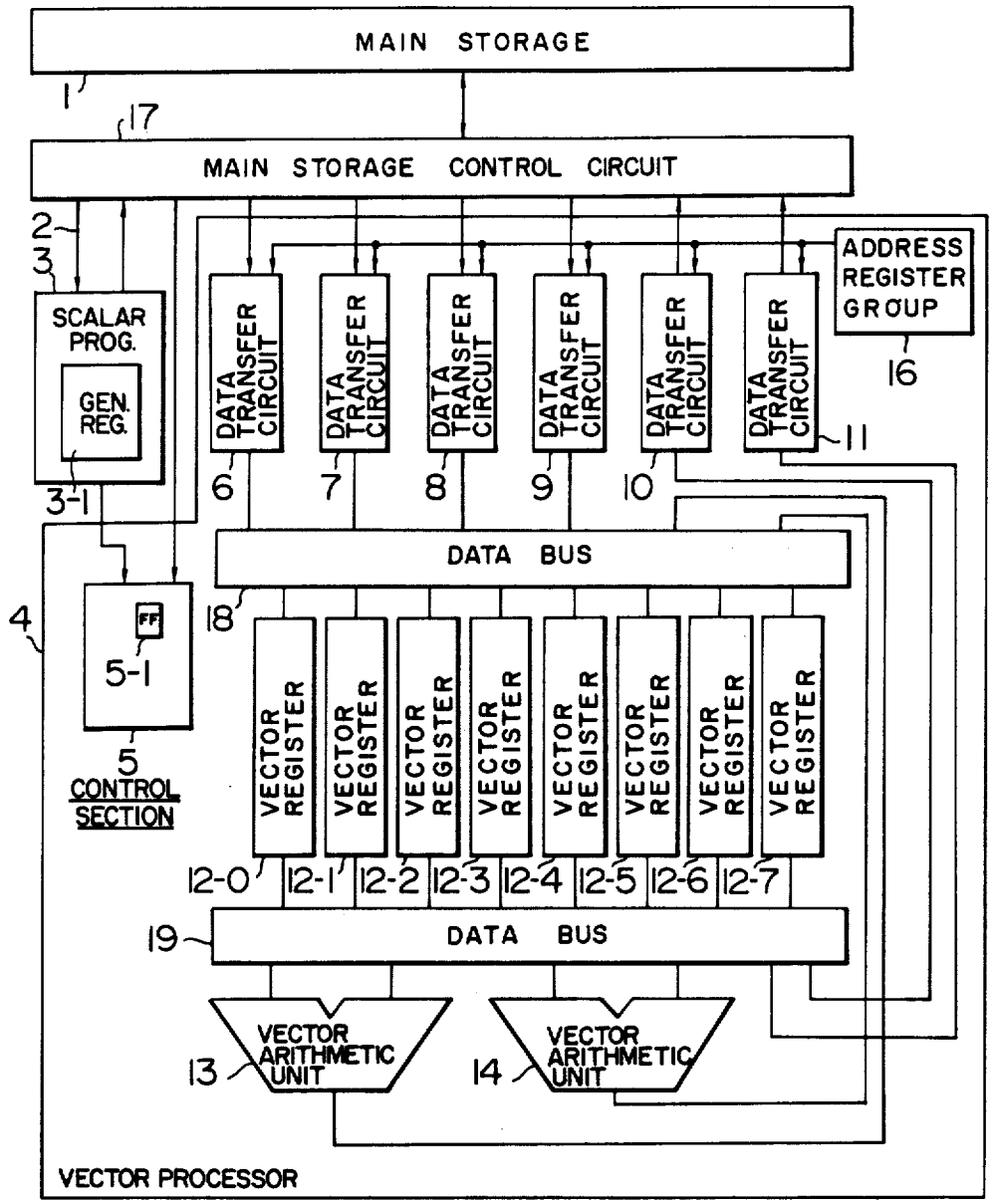
FIG. 1 is a block diagram of one embodiment according to the present invention.

FIG. 1 is a block diagram of one embodiment of the present invention. The summary of the whole operations will now be described hereinbelow. Namely, scalar instructions which were read out from a main storage (hereinafter, simply referred to as MS) 1 under control of a main memory control circuit 17 are processed by a scalar processor 3 through a scalar instruction readout bus 2. The scalar processor 3 is an ordinary computer and includes a general purpose register group 3-1 therein. When an instruction to instruct the start of processing of a series of vector instructions (hereinafter, referred to as an EXVP instruction) is read out, a vector processor control section 5 in a vector processor 4 is activated by the scalar processor 3. The vector processor control section 5 reads out the series of vector instructions from the vector instruction head address instructed by the EXVP instruction and interprets it, then it instructs the execution of the vector instructions to data transfer circuits 6–11, vector registers 12-0 to 12-7, and vector arithmetic units 13 and 14 in accordance with its interpretation result. The data transfer circuits 6–9 are used for data load; the data transfer circuits 10 and 11 are used for storing data; and an address register group 16 stores the memory addresses to be used in the data transfer circuits 6–11.

The vector processor control section 5 is provided with a mode controlling flip-flop (FF) 5-1. The scalar processor 3 activates the vector processor control section 5 by executing the EXVP instruction and at the same time instructs the mode with respect to whether the processings of the above-mentioned series of vector instructions are divisionally carried out or not. Hereinafter, the mode in which the vector processings are divisionally performed is called a PP (Pair Process) mode, while an ordinary mode in which the vector processings are processed without dividing them is called a SP (Single Process) mode. The PP or SP mode instructed by the scalar processor 3 is set into the mode control FF 5-1 in the vector processor control section 5, so that the vector processor control section 5 controls whether the data transfer circuits 6–11, vector registers 12-0 to 12-7, and vector arithmetic units 13 and 14 are divided into a plurality of sets or not in accordance with the instruction by the mode controlling FF 5-1.

Figure 2A:
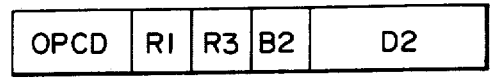
FIGS. 2A–2C are diagrams to show examples of the format of an EXVP instruction and examples of the data structure relating thereto.

FIG. 2A shows a format of the EXVP instruction. The meaning of each field of this instruction is as follows:

R1: The number of processing vector elements (first operand)

R3: Not used

B2+D2: Head address of the series of vector instructions

Now, the content of bit 0 of the general register to be designated by the B2 field is not used to produce the head address of the series of vector instructions, but is used to specify whether the processings of the series of vector instructions are divisionally carried out or not by being set into the mode controlling FF 5-1 provided in the vector processor control section 5.

Figure 2B:
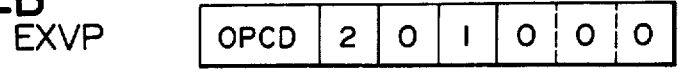
Figure 2B:
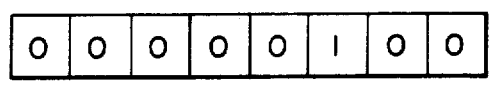
Figure 2B:
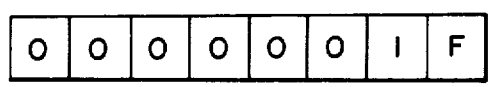
Figure 2C:
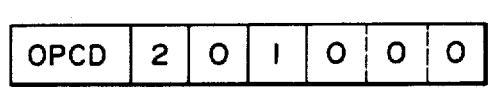
Figure 2C:
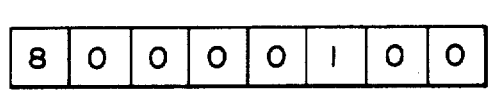
Figure 2C:
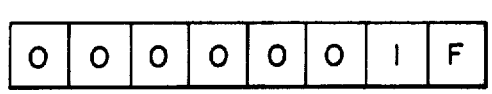
Figures 3A, 3B:
FIGS. 3A and 3B are diagrams showing an example of the program and a series of vector instructions corresponding thereto to describe the operation of the present invention.
Figure 8:
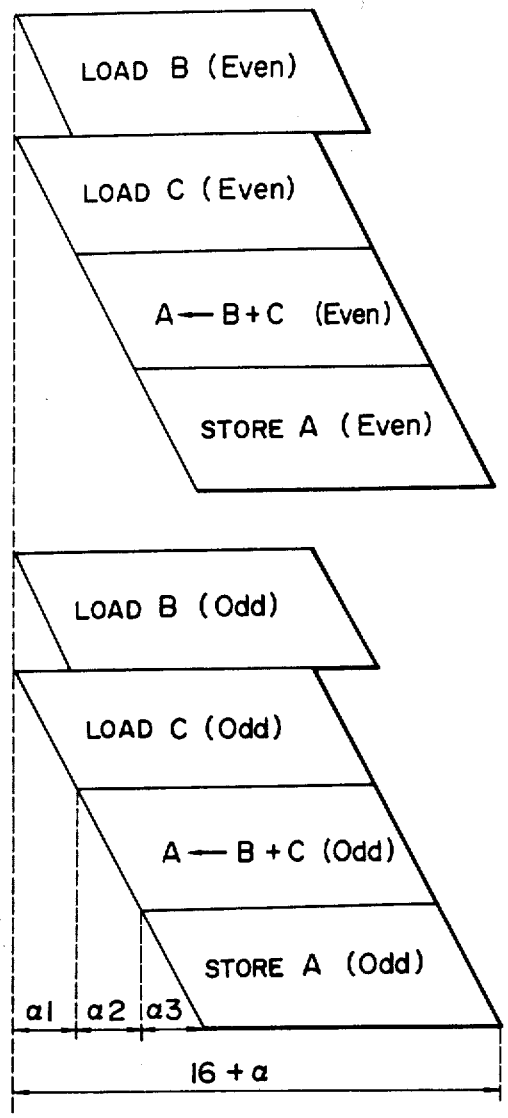

Now, when such a Do loop of the FORTRAN program as shown in FIG. 3A is converted into a series of vector instructions, they are as shown in FIG. 3B. It is now assumed that a series of vector instructions 15-1 to 15-5 and vector data A(i), B(i), C(i) (where, i=0, 1, ... , 31) are arranged on the MS in the manner as shown in FIG. 4. In the case where these vector processings are processed in the SP mode, the EXVP instruction and general registers (hereinbelow, called GRs) 1 and 2 as shown in FIG. 2B are set; on the other hand, in the case where they are processed in the PP mode, bit 0 of the GR1 is set into "1" as shown in FIG. 2C8 (therefore, 1 0 0 0=8).

In the vector processor shown in FIG. 1, the case will be described in detail hereinbelow where the Do loop of the FORTRAN program shown in FIG. 3 is processed in the SP and PP modes.

SP mode

In case of the SP mode, when the EXVP instruction shown in FIG. 2B is read out, the scalar processor 3 recognizes the head address 1 0 0 (16) of the series of vector instructions and processing vector length VL=1F (16) from the contents of GR1 and GR2 in the general register group 3-1, respectively, and then supplies this information to the vector processor control section 5. The vector processor control section 5 activated by the scalar processor 3 reads out the vector instructions from the head address 1 0 0 (16) instructed by the scalar processor 3 and sequentially interprets them, then instructs their executions to predetermined data transfer circuits, vector registers and vector arithmetic units. For the series of vector instructions of FIG. 3B, the executions are as follows.

The instruction 15-1 corresponds to the vector load of the original vectors B(i) (where, i=0, ... , 31) in the FORTRAN program of FIG. 3A. Although the instruction 15-1 can be executed by the loading data transfer circuits 6–9, the data transfer circuit 6 is used in this embodiment. The vector processor control section 5 adds VL=1F (16) and the address register number and activates the data transfer circuit 6 to execute the instruction 15-1, and at the same time it also adds VL=1F (16) to the VR (4) 12-4 on the side to be stored and activates it to write. The data transfer circuit 6 computes the address using the address register in the address register group 16 indicated by the control section 5 and reads out the vector data. The execution of the instruction 15-1 will be described hereinbelow with reference to FIG. 5.

Figure 5:
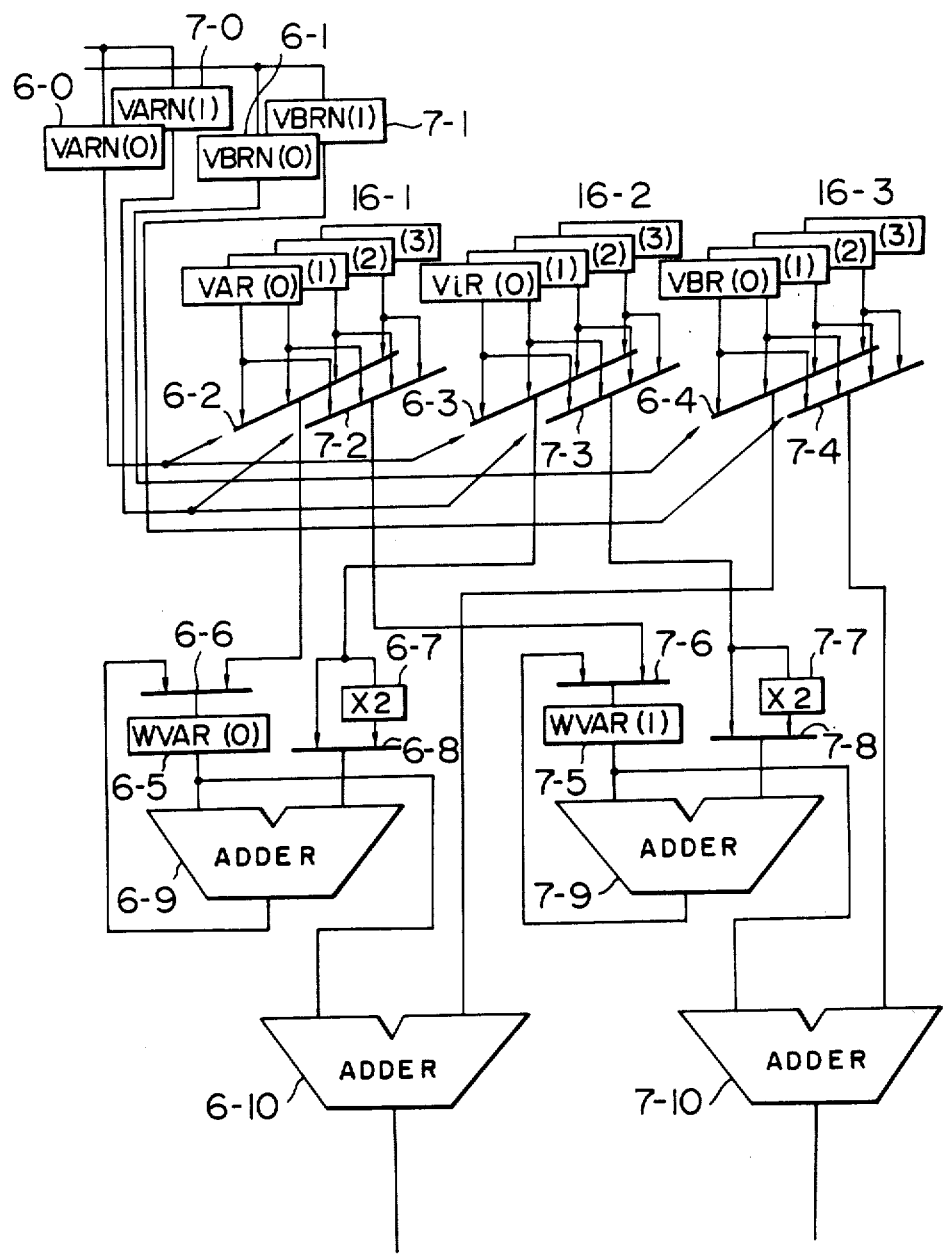
FIG. 5 is a detailed diagram showing the address register group and the data transfer circuits in FIG. 1.

FIG. 5 shows the details of the address register group 16 and data transfer circuits 6 and 7 of FIG. 1. The address register group 16 consists of four VARs (0–3) 16-1, four VIRs (0–3) 16-2, and four VBRs (0–3) 16-3. The data transfer circuit 6 consists of a register VARN (0) 6-0, register VBRN (0) 6-1, VAR selector 6-2, VIR selector 6-3, VBR selector 6-4, WVAR (0) 6-5, WVAR (0) input selector 6-6, VIR double circuit 6-7, selector 6-8, adders 6-9, 6-10, and their control logical circuits (not shown). Similarly, the data transfer circuit 7 consists of 7-1 to 7-10. The other data transfer circuits 8 to 11 are not shown in FIG. 5.

When the instruction 15-1 of FIG. 4 is activated in the data transfer circuit 6, the R2 field of the instruction is set into the register VARN (0) 6-0 and is used for selection of the VARs (0–3) and VIRs (0–3), and at the same time the R3 field is set into the register VBRN (0) 6-1 and is used for selection of the VBRs (0–3). In this embodiment, as shown in FIG. 6, VBR (0)=0, VAR (2)=300 (16), and VIR (2)=8 have been set up before execution of the EXVB instruction. The address computation of the vector data B(i) (where, i=0, 1, ..., 31) to be loaded in the VR (4) 12-4 by the instruction 15-1 is performed in the manner as described below. The VAR (2)=300 (16) selected by the VAR selector 6-2 in response to the value 0 2 (16) of the VARN (0) 6-0 passes through the WVAR (0) input selector 6-6 and is set into the WVAR (0) 6-5 and is inputted to the adder 6-10, then it is added to the VBR (0)=0 (16) selected by the VBR selector 6-4 in response to the value 0 0 (16) of the VBRN (0) 6-1, so that the address 3 0 0 (16) of B (0) is obtained as the output of the adder 6-10. The address 3 0 8 (16) of B (1) is obtained in such a manner that the result of which the VIR (2)=8 (16) selected similarly to the VAR (2) was added to the WVAR (0) 6-5=300 (16) passes through the selector 6-6 and is inputted to the WVAR (0) 6-5 and then it is again added to the VBR (0)=0 (16) by the adder 6-10. Then subsequent addresses of B (2) to B (31) are calculated in the same manner as described above. The vector data read out through the main memory control circuit 17 and MS 1 of FIG. 1 using these addresses is written in the VR (2)

12-2 through the data transfer circuit 6 and a switching circuit 18.

The above-described processings are carried out at a rate such that one element is processed in one machine cycle. If the overhead for instruction activation and the like is ignored, those processings need the processing time of only about vector length x one machine cycle time, in this embodiment about 32 machine cycles.

It is also possible to carry out the instruction 15-2 using the loading data transfer circuit 8 in substantially same manner as above.

The instruction 15-3 is executed using the arithmetic unit 13, the content of the VR (2) 12-2 and the content of the VR (3) 12-3 are added and are written in the VR (1) 12-1. The processing of this instruction is performed in about 32 machine cycles similarly to the above-mentioned processing of the instruction 15-1.

The instruction 15-4 can be executed using the storing data transfer circuit 10. When the data read out from the VR (1) 12-1 is sent to the data transfer circuit 10 through a switching circuit 19, the data transfer circuit 10 carries out the address calculation using the contents of the VBR (0), VAR (1) and VIR (1) in substantially the same manner as in the processings of the instructions 15-1 and 15-2 in the above-mentioned data transfer circuits 6 and 8 and adds the address to the data transferred from the VR (1) 12-1 and sends it to the main memory control circuit 17, thereby storing the vector data A(i) (where, i=1, 2, ..., 31) in the MS 1. This instruction processing is also performed in about 32 machine cycles.

The instruction 15-5 is a control instruction indicative of the end of a series of vector instructions, so that it is not substantially accompanied by the vector processing.

Figure 7:
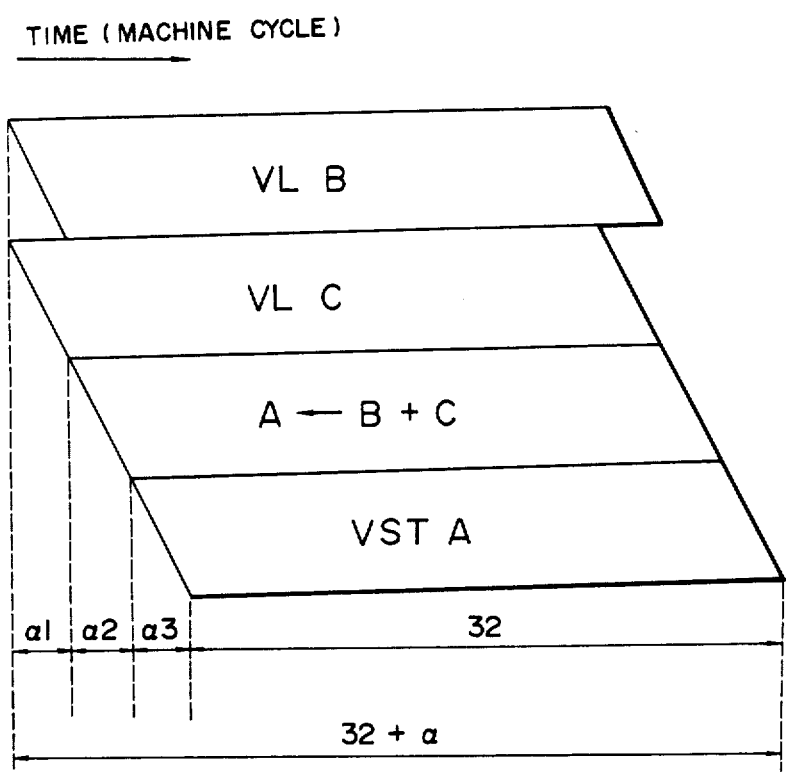
FIGS. 7 and 8 are schematic timing charts for the processings in each mode according to the present invention.

In the vector processor, each of such vector instruction processings as described above is generally processed by way of a pipeline and their pipeline processings are coupled, thereby to sequentially carry out the processings in the case of the vector element level but to carry out the processings in parallel in the case of the instruction level. Referring to the present embodiment, the readout operations of the vector elements B(0) and C(0) from the MS 1 and the storage operations to the VR (4) and VR (6) are simultaneously executed. Thereafter, the vector elements are immediately read out from the VR (4) and VR (6) and are added by the arithmetic unit 13 and then stored in the VR (2). Thereafter, it is immediately read out from the VR (2) and is stored in eight bytes from the address 2 0 0 (16) of the MS 1. These processings are performed 32 times in one machine cycle pitch, so that the processings of the above-mentioned five instructions are executed in parallel. It is now assumed that it takes α1 machine cycle until the data read out from the MS 1 is written in the VR; it takes α2 machine cycles until the data written in the VR is read out and computed and the result is written in the VR; it takes α3 machine cycles until the data written in the VR is read out and is written in the MS 1; and that α=α1+α2+α3. In this case, the schematic time charts of the above-described series of vector processings are as shown in FIG. 7. It can be seen from FIG. 7 that the whole processing time is 32+α machine cycles.

The data transfer circuits in the SP mode and the allocation algorithm of the arithmetic units are as shown in the following Table 1.

TABLE 1

| Priority of allocation | Vector Instructions | |
|---|---|---|
| | Load & Store Instructions | Arithmetic Instruction |
| 1 | Data Transfer Circuit 6 | Arithmetic Unit 13 |
| 2 | Data Transfer Circuit 7 | Arithmetic Unit 14 |
| 3 | Data Transfer Circuit 8 | |
| 4 | Data Transfer Circuit 9 | |
| 5 | Data Transfer Circuit 10 | |
| 6 | Data Transfer Circuit 11 | |

For example, while the data transfer circuits 6 and 7 are being used, when the load instruction or store instruction is decoded as a next instruction, the data transfer circuit 8 is assigned for that instruction in accordance with the above-mentioned algorithm. For the vector register, the vector register to be designated by the register specification field of the vector instruction is used.

PP mode

Next, in case of the PP mode, when the EXVP instruction shown in FIG. 2C is read out, the scalar processor 3 recognizes the head address 1 0 0 (16) of the series of vector instructions and the processing vector length VL=1F (16) from the contents of the GR1 and GR2 in the general register group 3-1, respectively, and sends this information to the vector processor control section 5. At the same time the scalar processor 3 recognizes that the processings are the processings in the PP mode on the basis of "1" of the 0th bit of the GR1 and notifies the vector processor control section 5. The vector processor control section 5 activated by the scalar processor 3 in the PP mode sets the mode controlling FF 5-1 and reads out the vector instructions from the head address 1 0 0 (16) instructed by the scalar processor 3 and sequentially interprets them, then instructs their executions. For the series of vector instructions of FIG. 3B, the processings are as follows.

In the previous SP mode, the instruction 15-1 is executed in the data transfer circuit 6 and the vector data B(i) (where, i=0, ..., 31) was stored in the VR (4) 12-4. On the contrary, in the PP mode, it is assumed that the instruction 15-1 is executed in the data transfer circuits 6 and 7 and the vector data B(i) (where, i=0, ..., 31) is stored in the VR (4) 12-4 and VR (5) 12-5. For this purpose the control section 5 adds VL=F (16) and the address register number and instructs the PP mode and activates the data transfer circuits 6 and 7 to execute the instruction 15-1. At the same time the control section 5 also adds VL=F (16) to the VR (4) 12-4 and VR (5) 12-5 on the side to be stored and activates the write operation. At this time it is not necessary to designate the PP mode for the VRs.

The execution of the instruction 15-1 in the PP mode will be described hereinbelow using FIG. 5. The VAR (2)=3 0 0 (16) and VBR (0)=0 are added by the adder 6-10 in the same manner as in case of the SP mode and as a result of this, the address 3 0 0 (16) of B (0) is outputted. Simultaneously with this addition, the VIR (2)=8 (16) passes through the selector 6-3 for VIR and is doubled by the VIR double circuit 6-7, then 1 0 (16) which was inputted to the adder 6-9 through the selector 6-8 and the VAR (2)=3 0 0 (16) stored in the WVAR (0) 6-5 are added, and the result is set into the WVAR (0) 6-5 through the WVAR (0) input selector 6-6. In the next cycle, this new value 3 1 0 (16) of the WVAR (0) and the VBR (0)=0 (16) are added, so that the address 3 1 0 (16) of B(2) is outputted. In the same way as described above, the data transfer circuit 6 carries out the address calculation of the elements bearing even numbers among the vector data B(i) (i=0, 1, ... 31), reads out the data from the MS 1 using its address, and thereafter stores the data in the VR (4) 12-4. At this time sixteen data are loaded in accordance with VL=F (16) instructed to the data transfer circuit 6 and VR (4) 12-4 upon activation.

When the elements bearing even numbers are loaded by the data transfer circuit 6, the loading of the elements bearing odd numbers is simultaneously executed in the data transfer circuit 7 in the same manner as described above. Upon activation of the instruction, the VAR (2)=3 0 0 (16) selected by the VAR selector 7-2 in response to the value 0 2 (16) of the VARN (1) 7-0 which had been set passes through the WVAR (1) input selector 7-6 and is set into the WVAR (1) 7-5 and is inputted to the adder 7-10. Likewise, the VIR (0)=8 (16) selected by the VIR selector 7-3 in response to the value 0 2 (16) of the VARN (1) 7-0 is inputted to the adder 7-10 through the selector 7-8. The addition result is set into the WVAR (1) 7-5 through the WVAR (1) input selector 7-6. This output of the WVAR (1) is added to the VBR (0)=0 (16) selected by the VBR selector 7-4 in response to the value 0 0 (16) of the VBRN (1) 7-1 in the adder 7-10, so that the address 3 0 8 (16) of B(1) is outputted. Thereafter twice the VIR is integrated by the adder 7-9 at one cycle pitch simultaneously with the address calculation of the B(i) (i=0, 2, 4, ..., 30) in the data transfer circuit 6, thereby outputting the addresses of B(i) (i=1, 3, 5, ..., 31). In this way, sixteen elements bearing odd numbers are stored in the VR (5) 12-5 by the data transfer circuit 7 using the addresses thus produced.

Similarly, in the PP mode, the instruction 15-2 is executed by the data transfer circuits 8 and 9, and the vector data C(i) (i=0, 1, 2, ..., 31) is stored in the VR (6) 12-6 and VR (7) 12-7. The instruction 15-3 is executed by the arithmetic units 13 and 14 and the addition result of the VR (4) 12-4 and VR (6) 12-6 is stored in the VR (2) 12-2, and the addition result of the VR (5) 12-5 and VR (7) 12-7 is stored in the VR (3) 12-3. The instruction 15-4 is executed by the data transfer circuits 10 and 11 and the data of the VR (2) 12-2 and VR (3) 12-3 are stored as A(i) (i=0, 1, ..., 31) in the regions from the address 2 0 0 (16) of the MS 1. FIG. 8 shows the schematic time charts in this case. It can be seen from FIG. 8 that the whole processing time is 16+α.

The data transfer circuit in the PP mode and the allocation algorithm of the arithmetic units are as shown in the following Table 2.

TABLE 2

| Priority of allocation | Vector Instructions | |
|---|---|---|
| | Load & Store Instructions | Arithmetic Instruction |
| 1 | Data Transfer Circuits 6 and 7 | Arithmetic Units 13 and 14 |
| 2 | Data Transfer Circuits 8 and 9 | |
| 3 | Data Transfer Circuits 10 and 11 | |

For example, while the data transfer circuit 6 is being used, when the load instruction or store instruction is decoded as a next instruction, the data transfer circuits 8 and 9 are assigned for that instruction in accordance with the above-mentioned algorithm. Even when they are simultaneously activated in this way, both data transfer circuits 8 and 9 are not always simultaneously released. Therefore, if the load instruction or store instruction is decoded as a next instruction when only either one of them is released and the other is not yet released, the data transfer circuits 10 and 11 will be assigned for that instruction. However, it is assumed that the data transfer circuit 6 is not yet released until that time point.

In addition, the value of the vector register specification field of the instruction must be 0, 2, 4, or 6 in the PP mode. For example, in case of the instruction 15-1, the VR (4) and VR (5) are assigned since the R1 field=4.

It will be understood from the above description that in the case where the numbers of VRs, data transfer circuits and arithmetic units which are needed are small in a series of vector instructions consisting of only simple instructions, this fact is recognized by the software, and the PP mode is designated by the EXVP instruction upon activation of the series of vector instructions and the above-mentioned vector processings are divided into the processings for the elements bearing even numbers and into the processings for the elements bearing odd numbers and thereafter they are processed, thereby enabling the processing speed to be improved. Furthermore, for a series of vector instructions including macro instructions, if arithmetic units which can execute the macro instructions by a single arithmetic unit by designating the SP mode are provided, it is possible to carry out the vector processings without providing buses between a plurality of arithmetic units.

According to the present invention, the kinds of vector processings are identified by a software or the like, and for the vector processings consisting of only simple instructions, the data transfer circuits, vector registers and arithmetic units are divided into a plurality of sets in accordance with the designation of the software or the like, and it is possible to divide the vector processings and to carry them out in parallel using those sets; therefore, the high-speed processing can be realized.

We claim:

1. A vector processor for carrying out vector instructions which designate a plurality of vectors by performing operations on vector elements belonging to the vectors comprising:

a main storage;

a plurality of vector registers;

means, including a plurality of vector data transfer circuits, for performing data transfer between said main storage and said vector registers;

means, including a plurality of vector arithmetic units coupled to said vector registers and each capable of performing the same arithmetic operations, for carrying out vector instructions by performing arithmetic operations on vector data received from said vector registers and sending the results to a vector register;

detecting means for detecting whether a vector instruction to be carried out is a first type of vector instruction designating operations between vector elements having the same element number or a second type of vector instruction designating operations between vector elements having different element numbers; and control means responsive to said detecting means for controlling the execution of a vector arithmetic operation in a first or second control mode in response to the type of the vector instruction detected by said detecting means, wherein said first control mode includes dividing vector registers and vector arithmetic units into a plurality of sets and dividing vector data to be operated on by a vector arithmetic instruction into a plurality of vector data portions, thereby to process the plurality of vector data portions in parallel using said plurality of sets, and said second control mode includes storing each vector data in corresponding vector registers, thereby to perform the vector arithmetic operation using the vector arithmetic units which operate together with said vector registers.

2. A vector processor according to claim 1, wherein among the vector processing, simple vector instructions consisting of only the operations which are to be executed between vector elements which have the same element number are executed in said first control mode, and wherein the complicated vector instructions which require operations between vector elements which have different element numbers are executed in said second control mode.

3. A vector processor for carrying out vector instructions which designate a plurality of vectors by performing operations on vector elements belonging to the vectors comprising:
  a main storage;
  a plurality of vector registers;
  means, including a plurality of vector data transfer circuits, for performing data transfer between said main storage and said vector registers;
  means, including a plurality of vector arithmetic units coupled to said vector registers and each capable of performing the same arithmetic operations, for carrying out the vector arithmetic instructions by performing arithmetic operations on the vector data received from said vector registers and for sending the results to the vector register;
  detecting means for detecting whether a vector instruction to be carried out is a first type of vector instruction designating operations between vector elements having the same element number of a second type of vector instruction designating operations between vector elements at least one of which is obtained as the result of another operation previously executed; and
  control means responsive to said detecting means for controlling the execution of a vector arithmetic operation in a first or second control mode in response to the type of the vector instruction detected by said detecting means, wherein said first control mode includes dividing vector registers and vector arithmetic units into a plurality of sets and dividing vector data to be operated by a vector arithmetic instruction into a plurality of vector data portions, thereby to process the plurality of vector data portions in parallel using said plurality of sets, and wherein said second control mode includes storing each vector data in corresponding vector registers, thereby to perform the vector arithmetic operation using the vector arithmetic units which operate together with said vector registers.

4. A vector processor for carrying out vector instructions which designate a plurality of vectors by performing operations on vector elements belonging to the vectors comprising:
  a main storage;
  a plurality of vector registers;
  means, including a plurality of vector data transfer circuits, for performing data transfer between said main storage and said vector registers;
  means, including a plurality of vector arithmetic units coupled to said vector registers and each capable of performing the same arithmetic operations, for carrying out vector arithmetic instructions by performing arithmetic operations on the vector data received from said vector registers and for sending the results of the arithmetic operations to the vector registers;
  control means, having a plurality of general purpose register and connected to receive from said main storage a vector start instruction instructs start of processing of a series of vector instructions, for storing data indicative of the type of vector instruction in one of said general-purpose registers designated by the vector start instruction, said type of the vector instruction being a first type of vector instruction designating operations between vector elements having the same element number or a second type of vector instruction designating operations between vector elements having different element numbers, and for controlling said vector processor to execute a vector arithmetic operation in a first or second control mode in accordance with indication of the data stored in said one of the general purpose registers, wherein said first control mode includes dividing vector registers and vector arithmetic units into a plurality of sets and dividing vector data to be operated by a vector arithmetic instruction into a plurality of vector data portions, thereby to process the plurality of vector data portions in parallel using said plurality of sets, and wherein said second control mode includes storing each vector data in corresponding vector registers, thereby to perform the vector arithmetic operation using vector arithmetic units which operate together with said vector registers.

* * * * *